United States Patent
Ku et al.

(10) Patent No.: US 6,267,004 B1
(45) Date of Patent: Jul. 31, 2001

(54) GLIDE TEST HEAD ASSEMBLY WITH HIGH TAKE-OFF RESOLUTION

(75) Inventors: Chiao-Ping Ku; Wei Yao, both of Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/247,445

(22) Filed: Feb. 10, 1999

Related U.S. Application Data (60) Provisional application No. 60/074,360, filed on Feb. 10, 1998.

(51) Int. Cl.[7] .................................................. G11B 5/60
(52) U.S. Cl. ............................. 73/104; 73/105; 360/103; 360/112
(58) Field of Search ..................... 73/104, 105; 360/103, 360/112

(56) References Cited

U.S. PATENT DOCUMENTS

| | | | |
|---|---|---|---|
| 3,292,169 | * | 12/1966 | D'Alessandro et al. ............. 360/103 |
| 4,218,715 | * | 8/1980 | Garnier ................................. 360/103 |
| 4,670,806 | * | 6/1987 | Ghose .................................. 360/103 |
| 5,021,906 | * | 6/1991 | Chang et al. ......................... 360/103 |
| 5,768,055 | * | 6/1998 | Tian et al. ............................ 360/103 |
| 5,771,570 | * | 6/1998 | Chhabra et al. ..................... 29/603.6 |
| 5,808,184 | * | 9/1998 | Boutaghou et al. ................... 73/105 |

FOREIGN PATENT DOCUMENTS

406084312A * 3/1994 (JP).

* cited by examiner

Primary Examiner—Hezron Williams
Assistant Examiner—Michael Cygan
(74) Attorney, Agent, or Firm—Raghunath S. Minisandram; Edward P. Heller, III (57) ABSTRACT

A glide test head assembly optimized for glide avalanche testing. The glide test head assembly of the present invention includes air bearing surfaces formed with a negative crown, or slightly concave surface. The negative crown of the air bearing surfaces of the inventive glide test head lowers the hydrodynamic pressure between the glide test head assembly and a spinning disc for given disc rotational speeds, enabling the glide test head assembly to fly at a lower heights at a greater linear velocity, and thus with increased stability. The increased flying stability of the inventive glide test head assembly improves the correlation between true flying height and disc/head contact detection for glide avalanche testing.

8 Claims, 5 Drawing Sheets

Figure 1

(Prior Art)

Figure 2

(Prior Art)

GLIDE TEST HEAD ASSEMBLY WITH HIGH TAKE-OFF RESOLUTION

CROSS-REFERENCE TO RELATED APPLICATION

This application claims the benefit of U.S. Provisional Application Ser. No. 60/074,360, filed Feb. 10, 1998.

BACKGROUND OF THE INVENTION

This invention relates generally to the field of rigid disc drives, and more particularly, but not by way of limitation, to a glide test head assembly for use in testing magnetic disc recording media surface characteristics.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $2.0\mu$", and products currently under development will reduce this flying height to $1.5\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs a precision spin stand and a specially configured glide test head including a piezo-electric sensing element, usually comprised of lead-zirconium-titanate ($PbZrTi_3$), also commonly known as a "pzt glide test head". The glide test is performed with the pzt glide test head flown at approximately half the flying height at which the operational read/write head will fly in the finished disc drive product. For instance, if the disc being glide tested is intended for inclusion in a disc drive in which the operational heads will fly at $2.0\mu$", the glide test will typically be performed with the pzt glide test head flying at $1.0\mu$". If the glide test is completed without contact between the pzt glide test head and any surface defects, then the disc is passed on the assumption that there will be no contact between the operational heads and the discs during normal operation with a nominal head flying height twice that of the pzt glide test head flying height.

A variant of the glide test, often used by disc media manufacturers, is sometimes referred to as a "glide avalanche" or GA test. In GA testing, a pzt glide test head is first flown at a greater than normal flying height above the disc surface. This initial increased flying height is commonly achieved by rotating the disc under test at a greater than normal speed, thus increasing the linear velocity between the disc and the test head, and increasing the strength and thickness of the air bearing supporting the test head above the disc surface.

The rotational speed of the disc under test is then gradually reduced until contact between the test head and disc occurs, at which point the current flying height is recorded. Correlation of a series of such test sequences at varying radii on the disc can be used by the disc media manufacturer as an indication of overall disc surface characteristics.

It is also common practice in the industry to provide a textured "landing zone" on the disc surface, on which the read/write head of the disc drive will come to rest during "power-off" or "sleep" conditions. Since the glide avalanche test simulates the loss of power to rotate the disc, the glide avalanche test is also frequently used by design engineers developing textured landing zones to study the landing characteristics of head assemblies on various types of landing zone textures.

The read/write head assemblies incorporated in disc drive products are commonly designed to provide rapid take-off of the head assemblies as the discs accelerate from stopped to operational speed to minimize frictionally-induced wear, and typical pzt-glide test heads also include air bearing structures with the same rapid take-off characteristics.

One technique frequently used to lower the linear velocity between discs and head assemblies at which head take-off occurs is to provide the air bearing surfaces of the head assemblies with a positive crown, or slightly convex surface. As is known to those of skill in the art, a positive crown on the air bearing surfaces of a head assembly causes the hydrodynamic pressure between the heads and the discs to increase rapidly with the increase in linear velocity between the heads and discs, and thus enables the head assemblies to begin to fly at a much lower linear velocity than would heads with perfectly planar air bearing surfaces.

It is also common practice in the industry to utilize such positive crowns on the air bearing surfaces of glide test heads.

However, when such glide test heads are used for the glide avalanche test described above, the low linear velocity necessary to bring about contact between the test head and the disc may also result in instability of the flying attitude of the test head at the time of contact, and subsequent ambiguity in the validity of the glide avalanche test results.

A need exists, therefore, for a glide avalanche test head assembly which is capable of stable flight at lower flying heights to enable reliable glide avalanche testing on discs including the extremely smooth surfaces of the current generation of disc media products.

SUMMARY OF THE INVENTION

The present invention is a glide test head assembly optimized for glide avalanche testing. The glide test head assembly of the present invention includes air bearing surfaces formed with a negative crown, or slightly concave surface. The negative crown of the air bearing surfaces of the inventive glide test head lowers the hydrodynamic pressure between the glide test head assembly and a spinning disc for given disc rotational speeds, enabling the glide test head assembly to fly at a lower heights at a greater linear velocity, and thus with increased stability. The increased flying stability of the inventive glide test head assembly improves the correlation between true flying height and disc/head contact detection for glide avalanche testing.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
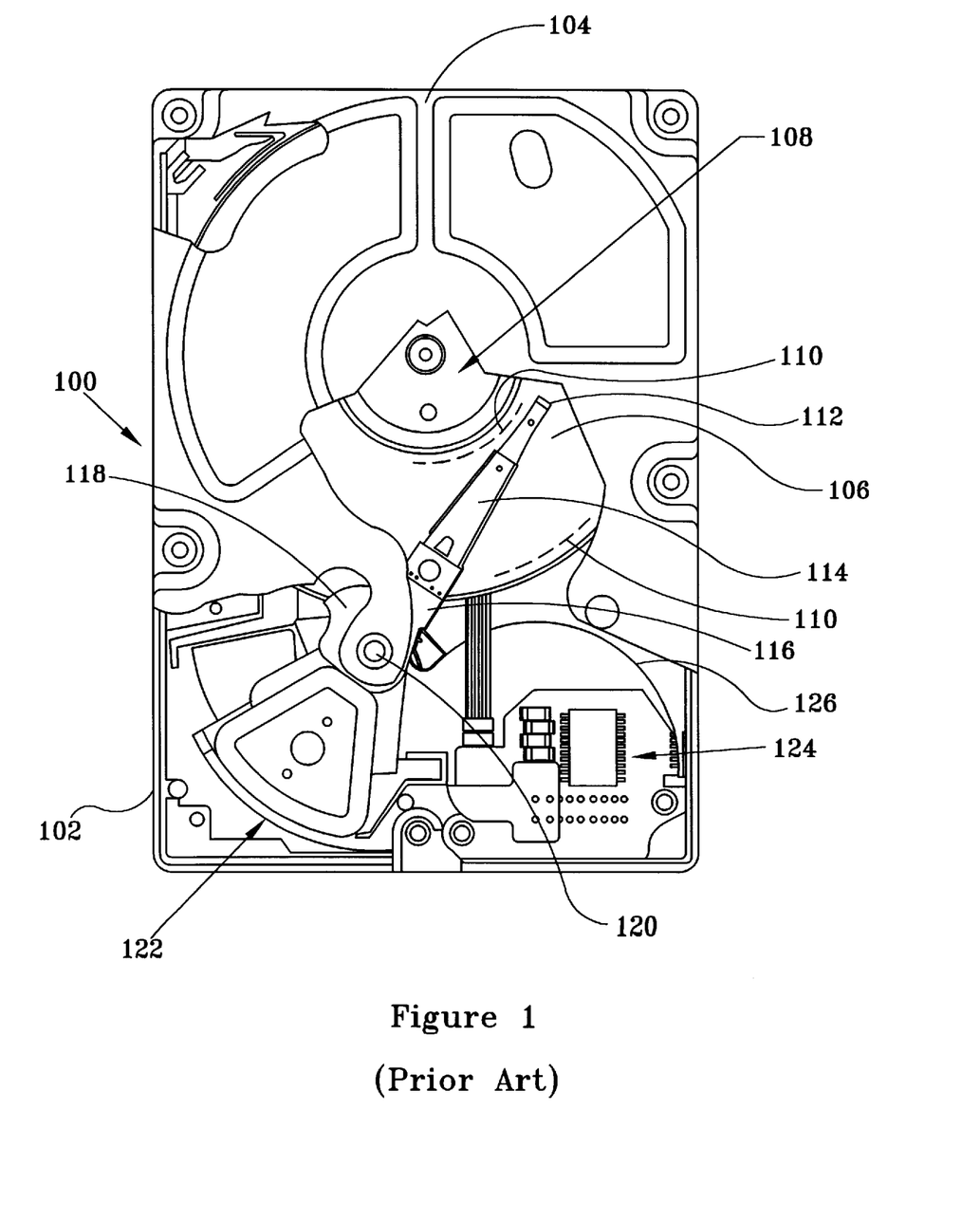
FIG. 1 is a plan view of a disc drive in which discs, which can be tested using the glide test head of the present invention, are utilized.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part to the existence of a controlled, precise relationship between the head assemblies 112 and the discs 106. Therefore, it is common in the industry to test each of the discs 106 included in the disc drive 100 before the discs 106 are assembled into a disc drive 100.

Figure 2:
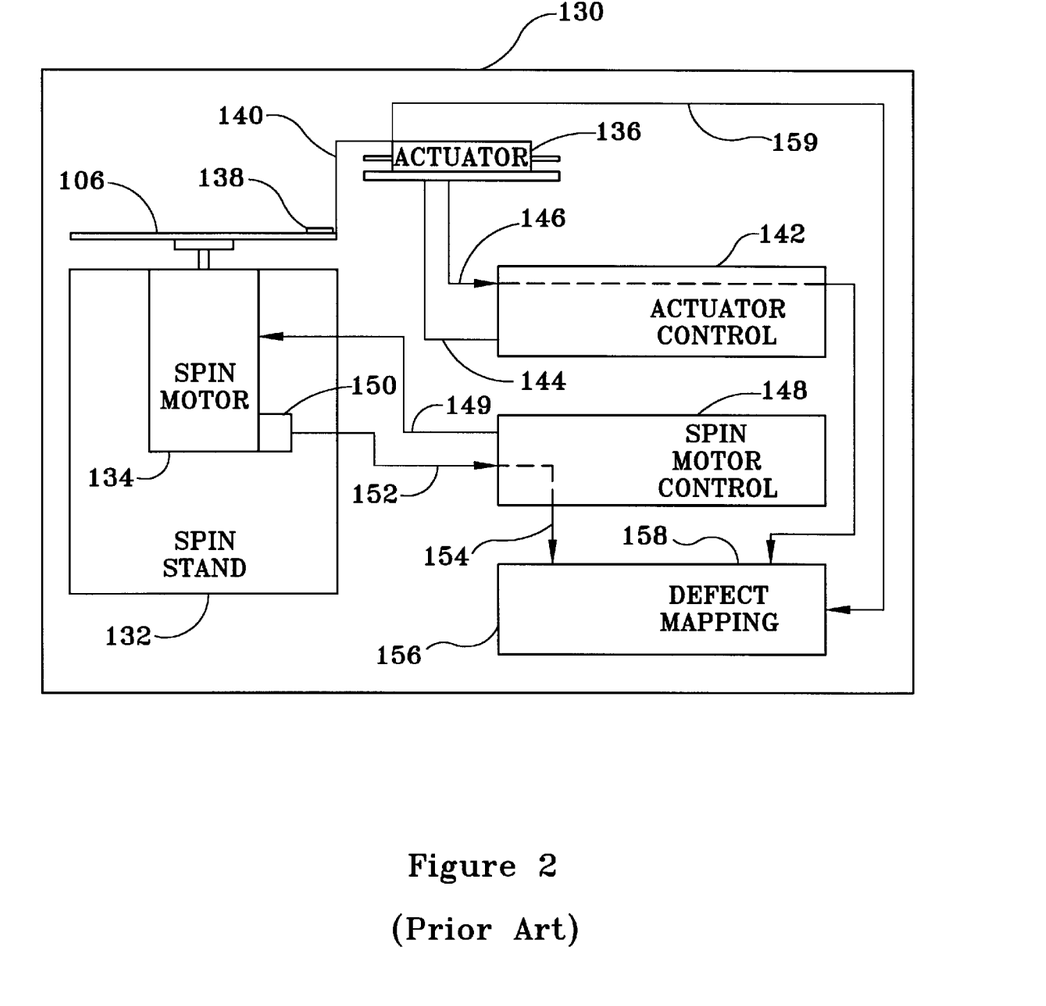
FIG. 2 is a simplified functional block diagram of a prior art test system in which the glide test head of the present invention can be integrated.

FIG. 2 is a simplified functional block diagram of a typical prior art test unit 130 used to test and map the surface of recording discs as components before the discs are assembled into disc drive units. The test unit 130 includes a precision spin stand 132 which further includes a spin motor 134 on which the disc 106 is mounted for rotation and testing.

The test unit 130 also typically includes a linear actuator 136 which is used to controllably move a test head 138, mounted on a head suspension 140, on a linear path across a radius of the disc 106. Actuator control logic 142 is also included in the test unit 130 and provides the control signals on signal path 144 needed to move the test head 138 and monitors, via signal path 146, the position of the test head 138 during testing of the disc 106. In a typical test unit of the current art, the actuator supports and controls a second test head for simultaneous testing of the second disc surface. For purposes of clarity, the figure shows only a single test head 138.

The test unit 130 also includes spin motor control logic 148 which is used to accelerate the spin motor 134 to its intended testing speed by passing motor drive signals on path 149. It is common practice in the industry to vary the speed of the spin motor 134 as the test head 138 is moved across the disc radius to provide a constant linear velocity between the test head 138 and the area of the disc being tested. That is, as the test head 138 is moved inward, the speed of the spin motor is increased proportionally to maintain a constant linear velocity, and thus maintain a constant flying height for the test head 138.

The spin stand 132 also includes a spin motor position encoder 150 which provides a position dependent reference signal. This reference signal is carried over signal path 152 to the spin motor control logic 148 where it is used to assist in the control of the speed of the spin motor 134. The reference signal is also passed via signal path 154 to defect mapping logic 156, where it is utilized, along with the actuator position signal passed via signal path 158 by the actuator control logic 142, to maintain a constant calculation of the radial and circumferential portion of the disc 106 that is located under the test head 138.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the test head 138 into cooperative arrangement with the surface of the disc 106. The test head 138 is then stepped across the spinning disc 106 at a rate selected to cause the test head 138 to pass over every portion of the disc surface. As the head is stepped across the disc surface, the spin motor control logic 148 varies the spin motor speed to maintain a constant relative linear velocity between the test head 138 and the disc area being tested as noted above.

A defect on the disc surface will cause the test head 138 to generate a defect signal which is passed to the defect mapping logic 156 via signal path 159. Recognition of the defect signal by the defect mapping logic 156 results in the current radial and circumferential location of the test head 138 relative to the disc 106 being recorded. Once the test head 138 has passed over the entire usable radial extent of the disc 106, all detected and recorded defects are correlated to produce a defect map of the entire disc surface.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

Figure 3:
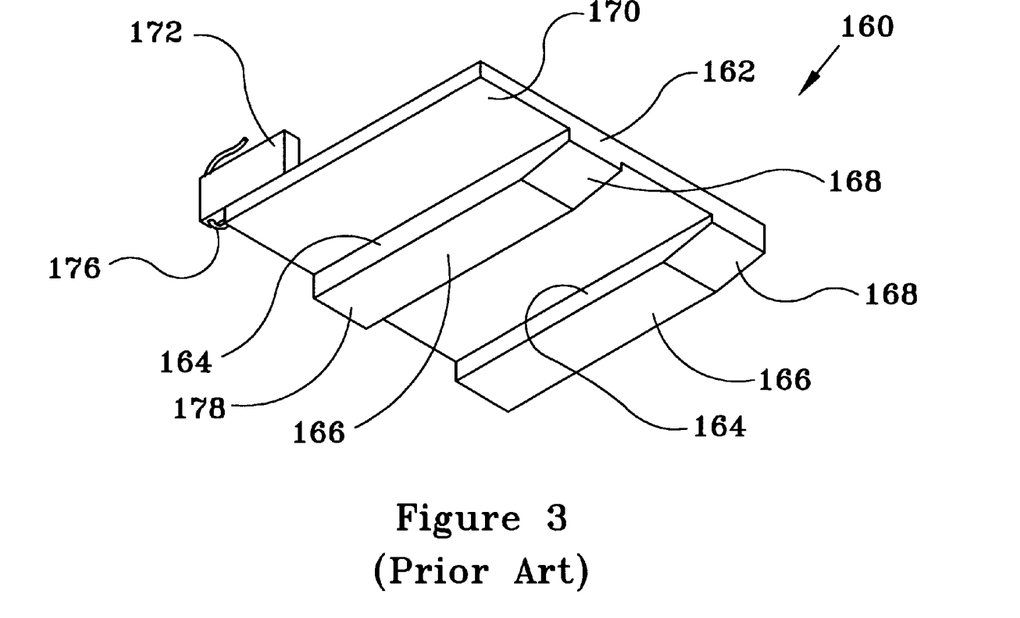
FIG. 3 is a simplified bottom perspective view of a typical prior art glide test head.
Figure 4:
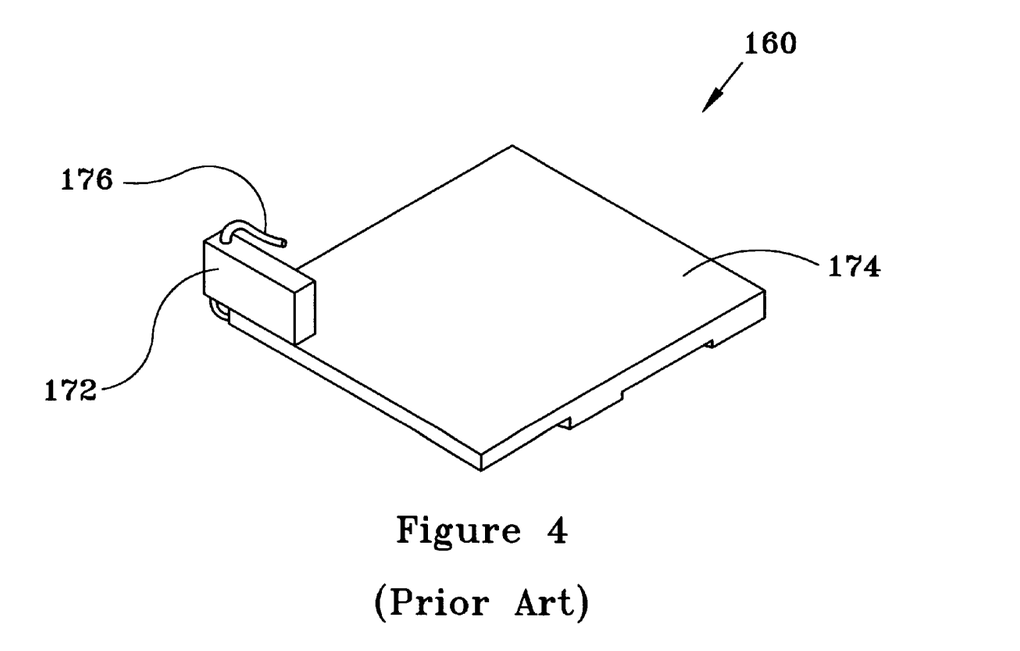
FIG. 4 is a simplified top perspective view of a typical prior art glide test head.

FIGS. 3 and 4 are, respectively, simplified bottom and top perspective views of a typical prior art glide test head 160. The glide test head consists of a slider body 162 which is typically formed from a stable ceramic material, such as aluminum oxide/titanium carbide. Features of the slider body 162 are commonly formed using the processes of machining, ion etching and precision lapping.

The glide test head 160 is of the type sometimes referred to as a "catamaran" slider configuration, since it includes a pair of laterally displaced rails 164. The rails 164 include air bearing surfaces 166, which interact with a thin layer of air dragged along by the spinning disc to fly the glide test head 160 at a desired fly height above the surface of the disc being tested. As is known to those of skill in the art, the flying height is determined, in part, by the geometry of the air bearing surfaces, and the flying attitude of the slider body is a function of the geometry of the air bearing surface, as well as the head suspension (140 in FIG. 2) used to support the glide test head 160.

At the leading edge of the air bearing surfaces 166 the rails 164 also typically include beveled regions 168 which are included to aid in the rapid establishment of the air bearing between the slider body 162 and the spinning disc.

While other forms of slider bodies are known in the art, such as tri-pad sliders and negative pressure air bearing sliders, the scope of the present invention is not envisioned as being limited by the specific form of air bearing elements included in the slider body 162. The catamaran form of FIGS. 3 and 4 has been chosen for illustrative purposes only, due to its familiarity and simplicity.

FIGS. 3 and 4 show that the slider body 162 also includes a laterally extending wing 170 which is used to mount a piezoelectric crystal, or piezo element 172. The reason that the slider body 162 must include the wing 170 for mounting the piezo element 172 is that that portion (shown at 174, generally, in FIG. 4) of the slider body 162 above the rails 164 is used to attach the head suspension (140 in FIG. 2) used to support the glide test head 160.

The piezo element 172 can be seen in the figures to include attached signal wires 176. During operation, such as in a test system similar to that of FIG. 2, any contact between the air bearing surfaces 166 and a surface asperity on the disc under test will result in vibration or ringing of the entire slider body 162. This excitation of the slider body 162 is conveyed to the piezo element 172 which responds to this excitation by outputting electrical signals on the signal wires 176. These electrical signals are passed to appropriate detection logic (such as the defect mapping logic 156 of FIG. 2). If, as noted in the discussion of FIG. 2 above, the occurrence of the output of the piezo element 172 is correlated to the position of the actuator and the rotational position of the disc under the glide test head, a defect map of the disc under test can be generated.

Figure 5:
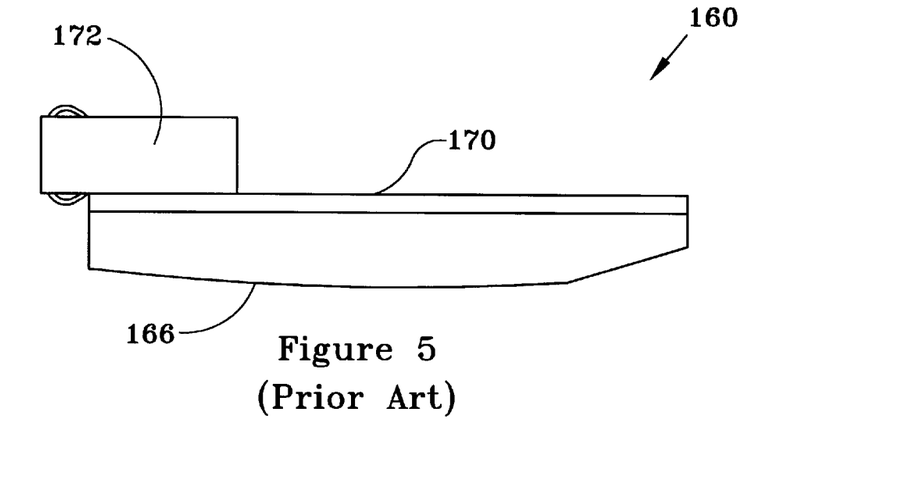
FIG. 5 is a simplified side elevation view of the prior art glide test head of FIGS. 3 and 4.

FIG. 5 is a simplified side elevation view of the prior art glide test head assembly of FIGS. 3 and 4. As can be seen in the figure, the air bearing surfaces 166 of the glide test head 160 have a positive crown, or convex surface. In actual glide test heads, the amount of convexity of the air bearing surface is up to approximately $2\mu$". The amount of positive crown has been greatly exaggerated in FIG. 5 for illustrative purpose only.

Having a positive crown allows the prior art glide test head 160 to begin flying at a lower linear velocity than would be possible if the air bearing surfaces 166 were to be flat, and thus reduces the amount of time that the glide test head 160 would be in contact with the surface of the disc, if the glide test head 160 were in contact with the disc when the disc starts to accelerate to it operational rotational speed. This capability is important in operational read/write heads incorporated into disc drives that are of the "contact start/stop" type, i.e., those disc drives which allow the heads to come to rest on the disc surface when power to the disc drive is lost, or during power-conserving "sleep" conditions. However, at the initial low take-off speed, the flying attitude of the head is relatively unstable, allowing the attitude of the head to vary in both the pitch and roll axes. While this instability is of little significance in the operational read/write heads of a disc drive, such instability is detrimental in glide avalanche testing.

It will be recalled from earlier discussion of glide avalanche testing that the test is typically performed by having the test head flying at a higher-than-normal flying height, due to higher-than-normal disc rotational speed. The speed of disc rotation is then reduced gradually until contact occurs between the test head and the disc.

If the glide avalanche test head has a positive crown, as does the prior art glide test head 160 of FIG. 5, the disc rotational speed will have to be reduced to a point where the stability of the flying attitude of the test head suffers before contact with the disc is to be expected. This reduced stability causes the reliability of the glide avalanche contact inception to be questionable, especially on the extremely smooth discs of the current generation.

Figure 6:
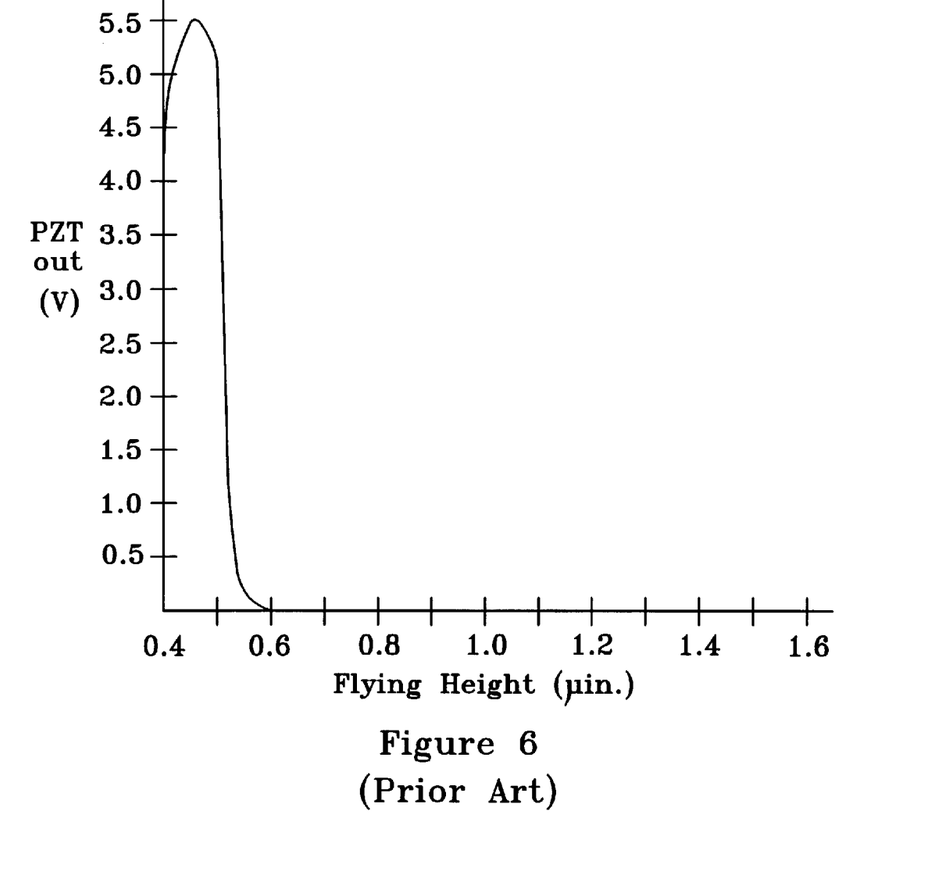
FIG. 6 is a graph showing the correlation between flying height and piezo element output for a typical prior art glide test head.

FIG. 6 is a graphic representation of the output of the piezo element 172 of the prior art glide test head 160 of FIG. 5, showing the relationship between the piezo element output, in volts on the vertical axis, versus the flying height of the glide test head, in $\mu$" on the horizontal axis. This graphic representation is a idealization of the oscilloscope picture that can be obtained during a glide avalanche test with the prior art glide test head 160 of FIG. 5.

As can be seen in FIG. 6, the piezo element output peaks at approximately 5.5 volts at an apparent flying height of less than $0.5\mu$". However, with the positive crown on the air bearing surfaces of the prior art glide test head 160 of FIG. 5, this result includes certain ambiguities. Specifically, it is not certain whether the contact that caused the piezo element output is a result of a surface irregularity on the disc, or is caused by the unstable flying attitude of the glide test head 160 itself. That is, as the pitch and roll attitude of the glide test head 160 become unstable at the low linear velocity needed to bring the glide test head 160 into proximity with the disc surface being tested, the "rocking" of the glide test head in its pitch and roll axes can cause portions of the glide test head 160 to be much closer to the disc surface than would be expected if the flying attitude of the glide test head were known to be stable at this relatively low linear velocity.

It is the ambiguity of the glide avalanche test results that the present invention is directed to alleviating.

Figure 7:
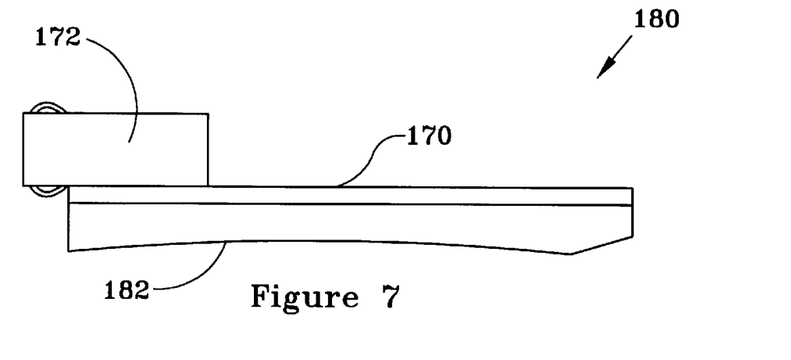
FIG. 7 is a simplified side elevation view of the glide test head of the present invention.

FIG. 7 is a simplified side elevation view, similar to FIG. 5, of the glide test head 180 of the present invention.

As can be seen in FIG. 7, the inventive glide test head 180 also includes a laterally-extending wing 170 on which is mounted a piezo element 172, as in the prior art glide test head 160 of FIG. 5.

The air bearing surface 182 of the inventive glide test head 180, however, can be seen to have a negative crown, or concave shape. Once again, as in FIG. 5, the amount of negative crown or concavity has been greatly exaggerated for illustrative purposes, and the actual amount of negative crown incorporated in the air bearing surfaces 182 of the glide test head 180 of the present invention is actually envisioned as being on the order of $0.5-2\mu$".

The effect of the negative crown on the operation of the glide test head of the present invention will be appreciated by one of skill in the art upon reading this disclosure. That is, just as a positive crown on the air bearing surfaces caused the prior art glide test head 160 of FIG. 5 to begin flying at a lower linear velocity than normal, the negative crown on the air bearing surfaces 182 of the glide test head 180 of the present invention causes it to begin flying at a much higher-than-normal linear velocity, and allows it to fly a much lower flying heights at higher linear velocities. This, in turn, means that the glide test head 180 of the present invention, if used in the glide avalanche test described above, will fly closer to the disc surface at a higher linear velocity and will thus fly with a much more stable attitude at these lower flying heights than can the prior art glide test head 160 of FIG. 5.

Therefore, if the graphical representation of the piezo element output shown in FIG. 6 were to be obtained from the glide test head 180 of the present invention, it can be assumed with a very high degree of confidence that the contact between the glide test head 180 and the disc that is reflected in the output of the piezo element is, indeed, indicative of a surface irregularity on the disc being tested, rather than an indication of instability in the flying attitude of the glide test head 180 itself.

Figure 8:
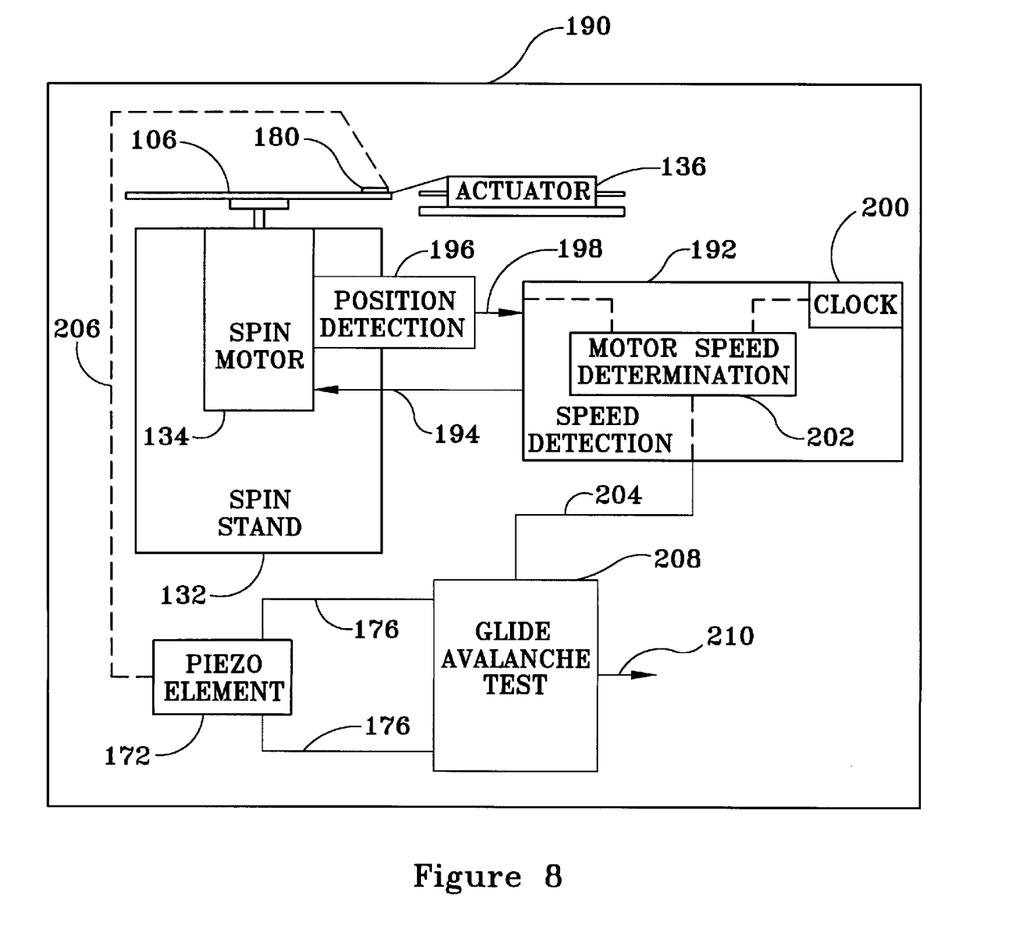
FIG. 8 is a simplified functional block diagram of a test system, similar to the prior art test system of FIG. 2, which has been modified to include the glide test head of the present invention.

FIG. 8 is a simplified functional block diagram of a test system 190, similar to the prior art test system 130 of FIG. 2, which has been modified to include the glide test head 180 of the present invention, and supporting electronic circuitry.

The test system 190 of FIG. 8 can be seen to include a precision spin stand 132 and spin motor 134 for supporting and rotating a disc 106 to be tested, as did the prior art test system 130 of FIG. 2. The test system 190 also includes a linear actuator 136, as in the prior art, and, although it is not shown in FIG. 8, actuator control logic for controlling the motion and detecting the position of the actuator 136, similar to the actuator control logic 142 of FIG. 2, would also be included in the test system 190.

The test system 190 also includes spin motor control and speed detection logic 192 that transmits motor drive signals to the spin motor 134 on path 194. Associated with the spin motor 134 is a spin motor position detection element 196 which transfers information concerning the rotational position of the spin motor 134 to the spin motor control and speed detection logic on path 198.

The spin motor control and speed detection logic 192 will also include a precision clock circuit 200 whose output is combined with the spin motor position information on path 198 by motor speed determination circuitry 202. That is, the rotational position of the spin motor 134 is compared to the output of the precision clock circuit 200 by the motor speed determination circuitry 202 to develop a motor speed output on path 204.

The piezo element 172, which is a physical part of the glide test head 180, as shown by dashed line 206, will react to any contact between the glide test head 180 and the disc 106 by outputting an electrical contact detection signal on the lead connections 176. This contact detection signal is passed to glide avalanche test logic 208.

The glide avalanche test logic includes known parametric information about the glide test head 180, such as the flying height versus linear velocity characteristics of the glide test head 180.

Glide avalanche testing of the disc 106 is accomplished by first bringing the spin motor 134 with the disc 106 mounted thereon up to a selected rotational speed that is great enough to fly the glide test head at a first known fly height above the disc 106. This first known fly height is higher than the height of any expected surface irregularities on the disc surface.

The linear actuator is then moved, in a manner well known in the art, to bring the glide test head 180 over the disc surface to place the glide test head at a known radial position at the first known fly height.

The speed of the spin motor 134 is then gradually reduced until the first contact between the glide test head 180 and the disc 106 occurs. This contact causes the piezo element 172 of the glide test head 180 to output the contact detection signal to the glide avalanche test logic 208 on lead connections 176.

In the glide avalanche test logic 208, the contact detection signal causes the spin motor speed signal on path 204 to be sampled, and compared with the known flight parameters of the glide test head 180, to determine the flying height at which the contact between the glide test head 180 and the disc 106 occurred.

FIG. 8 also shows that the glide avalanche test logic 208 includes an output 210 which can be in the form of a drive signal for an oscilloscope, to provide a graphic representation of the glide avalanche test results, such as the graphic representation of FIG. 6, or in the form of digital data for transfer to a statistical data base for later analysis, or in the form of drive signals to a visual display.

It will also be appreciated by one of skill in the art that the above steps can be repeated with the glide test head 180 positioned at various radii of the disc 106, should such further testing be desired.

In summary, the present invention provides a glide test head 180 with air bearing surfaces 182 formed with a negative crown, or convexity. The negative crown of the air bearing surfaces 182 of the glide test head 180 of the present invention allows the glide test head 180 of the present invention to fly at lower flying heights at higher linear velocities than can prior art glide test heads with either no air bearing crown characteristics or with positive crown characteristics. Because the glide test head 180 of the present invention is capable of lower flying heights at higher linear velocities, it also flies with greater attitude stability than can prior art glide test heads at low flying heights, increasing the reliability of test results obtained during glide avalanche testing with the glide test head of the present invention.

From the foregoing, it is apparent that the present invention is particularly well suited and well adapted to achieve the functionality set forth hereinabove, as well as possessing other advantages inherent therein. While a particular configuration of the present invention has been disclosed as an example embodiment, certain variations and modifications which fall within the envisioned scope of the invention may be suggested to one of skill in the art upon reading this disclosure. Therefore, the scope of the present invention should be considered to be limited only by the following claims.

What is claimed is:

1. A glide test head comprising:

a laterally-extending wing;

a piezo element mounted on the laterally-extending wing for outputting a contact detection signal reflective of contact between the glide test head and a disc, the piezo element further comprising output lead connections for carrying the contact detection signal; and air bearing surfaces each formed with a negative crown to support the glide test head over the disc.

2. A glide test head as claimed in claim 1 wherein the magnitude of the negative crown is substantially 0.5 to 2.0 microinches.

3. A glide test head as claimed in claim 1 wherein the air bearing surfaces comprise a pair of laterally displaced, longitudinally extending rails and wherein the negative crown comprises a longitudinally extending concavity in each rail.

4. A test system for performing glide avalanche testing on a magnetic recording disc, comprising;

a spin motor for supporting and rotating the disc at controllable speeds; means for generating a disc speed signal reflective of the angular speed of the disc;

a glide test head assembly comprising:

a laterally-extending wing;

a piezo element mounted on the laterally-extending wing for outputting a contact detection signal reflective of contact between the glide test head and the disc, the piezo element further comprising output lead connections for carrying the contact detection signal; and air bearing surfaces formed with a negative crown;

an actuator assembly for moving said glide test head assembly radially across the disc; and glide avalanche test logic, responsive to said disc speed signal and to said contact detection signal for determining size of topographic irregularities on the surface of the disc.

5. A glide test head for glide avalanche testing on a magnetic recording disc, comprising:

a slider body having a longitudinal axis parallel with a direction of rotation of the disc, the slider body comprising an air bearing surface having a negative crown along the longitudinal axis; and detection means for detecting contact between the glide test head and the magnetic recording disc.

6. A glide test head as claimed in claim 5 wherein the detection means comprises a piezo element mounted to the slider which outputs a contact detection signal reflective of contact between the glide test head and the disc.

7. A glide test head as claimed in claim 6 further comprising a wing which laterally extends from the slider body, wherein the piezo element is mounted to the wing.

8. A glide test head as claimed in claim 5 wherein the air bearing surface comprises a pair of laterally displaced longitudinally extending rails.

* * * * *